United States Patent
Bailey (10) Patent No.: US 7,093,291 B2
(45) Date of Patent: Aug. 15, 2006

(54) METHOD AND SYSTEM FOR DETECTING AND PREVENTING AN INTRUSION IN MULTIPLE PLATFORM COMPUTING ENVIRONMENTS

(76) Inventor: Ronn H. Bailey, 365 Montcliff Ave., Henderson, NV (US) 89014

( * ) Notice: Subject to any disclaimer, the term of this patent is extended or adjusted under 35 U.S.C. 154(b) by 822 days.

(21) Appl. No.: 10/057,157

(22) Filed: Jan. 28, 2002

(65) Prior Publication Data
US 2003/0145224 A1    Jul. 31, 2003

(51) Int. Cl.
    G06F 7/04      (2006.01)
    G06F 17/30     (2006.01)
    G06K 9/00      (2006.01)
    H04L 9/00      (2006.01)
    H04K 1/00      (2006.01)
    G06K 19/00     (2006.01)

(52) U.S. Cl. .................. 726/23; 726/8; 713/183
(58) Field of Classification Search ............ 713/183, 713/202; 726/23, 8
See application file for complete search history.

(56) References Cited

U.S. PATENT DOCUMENTS

| | | | | |
|---|---|---|---|---|
| 5,224,163 A * | 6/1993 | Gasser et al. | ................. | 380/30 |
| 5,961,593 A * | 10/1999 | Gabber et al. | .............. | 709/219 |
| 6,000,033 A * | 12/1999 | Kelley et al. | ............... | 713/201 |
| 6,263,369 B1 * | 7/2001 | Sitaraman et al. | .......... | 709/225 |
| 6,321,338 B1 * | 11/2001 | Porras et al. | ............... | 713/201 |
| 6,338,138 B1 * | 1/2002 | Raduchel et al. | ........... | 713/155 |
| 2001/0029496 A1 * | 10/2001 | Otto et al. | .................... | 705/74 |
| 2002/0178370 A1 * | 11/2002 | Gurevich et al. | ........... | 713/189 |
| 2003/0070074 A1 * | 4/2003 | Geller et al. | ................ | 713/168 |
| 2006/0018466 A1 * | 1/2006 | Adelstein et al. | ............ | 380/46 |

FOREIGN PATENT DOCUMENTS

WO    WO 9964967 A1 *  12/1999

OTHER PUBLICATIONS

Auyong, Keok et al. "Authentication Services for Computer Networks and Electronic Messaging Systems".*
Blank-Edelman, David N. "Perl for System Administration, First Edition", Jul. 2000, <http://www.unix.org.ua/orelly/perl/sysadmin/>.*

(Continued)

Primary Examiner—Jacques H. Louis-Jacques
Assistant Examiner—Michael J. Simitoski
(74) Attorney, Agent, or Firm—Morland C. Fischer (57) ABSTRACT

A method and a system by which to achieve authentication intrusion detection so as to effectively detect and prevent unauthorized access to and use of a local computer system, or the like, and take appropriate measures. The local system authentication process is redirected to an authenticator broker system (i.e. a secondary authentication system) that makes use of the local system authentication process paths and the local system authenticator file. The authenticator broker system includes an authenticator broker system file having stored therein secret authenticators of prospective users, a mapping file to assign a replacement identifier for the identifier entered by a particular user at the local system and redirected to the secondary system, and a decoy authenticator file to assign a decoy authenticator for the secret authenticator entered by the user and originally stored in the local system authentication file. It is the decoy authenticator that is captured and unknowingly used by the intruder to give away his or her presence. By way of example, the authenticator broker system may be a mainframe computer that is responsible for authentication and access control with respect to a local computer system.

12 Claims, 4 Drawing Sheets

OTHER PUBLICATIONS

Hauser, Ralf C. et al. "Reducing the Proliferation of Passwords in Distributed Systems", 1992.*

IBM. IBM Technical Disclosure Bulletin NN9303451, Mar. 1993.*

Lin, Hung-Yu et al. "Authentication Protocols for Personal Communication Systems", 1995 ACM.*

Stallings, William. Cryptography and Network Security, Principles and Practices Second Edition, 1999 Prentice-Hall, Inc., pp. 323-341, 350-353 & 480-483.*

Weiss, Kenneth P. "When A Password is not a Password", 1990 IEEE.*

* cited by examiner

METHOD AND SYSTEM FOR DETECTING AND PREVENTING AN INTRUSION IN MULTIPLE PLATFORM COMPUTING ENVIRONMENTS

BACKGROUND OF THE INVENTION

1. Field of the Invention

This invention relates generally to a reliable unattended, automatic security method and corresponding apparatus for effectively detecting and preventing intrusions in multiple platform computing environments by using a computer host system for authentication and access control with respect to a local system.

2. Background Art

The modern workplace often involves interchanging of information through a communications medium. To participate in this interchange, one usually goes through a credential verification that takes place over this medium. The verification process often involves a comparison of a User ID and a record in a repository associated with that User ID. If the medium or the repository is vulnerable to comprise then extra steps must be taken to preserve security.

Most security systems have User ID authentication and authorization requirements built into the host system. By permitting desk-top Internet access from multiple-platform computing environments, a new generation of security risks has been created as a consequence of highly motivated, highly skilled outsiders or hackers who often seek to break into a system. Accordingly, what is needed to combat both new and prior security risks is a new generation of host and network based intrusion detection tools that are capable of performing an effective unattended automatic security function to detect and prevent entry to and compromise of multiple platform computing environments from unauthorized intruders who deliberately try to misuse the system.

In contemporary multiple-platform computing environments, there are multiple authentication repositories that are responsible for authenticating users. Such repositories can be files in a file system that contain a user's ID, a registry key within the registry of the operating system, or a remote database on another computer from which a user is verified. However, and as far as is known, there are no authentication repositories that have proven to be invulnerable to every possible attack.

SUMMARY OF THE INVENTION

In general terms, a method and a host system are disclosed by which to achieve authentication intrusion detection so as to effectively detect and prevent unauthorized access to and use of a local computer system, or the like, e.g., by hackers and intruders. The method herein described is particularly useful when a user attempts to sign-on at the local computer system by using an identifier (i.e. a user name) and a secret authenticator (i.e. a password) to identify himself or herself as one who is authorized to gain access to the local system. The user signing on to a local system supplies a secret authenticator to a client on the local computer system that will transmit the information to an authentication broker system (ABS), which can advantageously be located on a remote host computer, such as a mainframe computer. The host ABS transmits a decoy password to the client on the local computer system. The host ABS records the issued decoy password. Then the client on the local computer system uses the decoy password to log the user onto the local computer system. Therefore, the local computer system will always have the decoy password stored in its repository of user information and the host ABS will always have the valid repository of user information. Users never know the decoy password that is associated with them and stored in the local computer system.

An intruder can capture user information from the local computer system using known weaknesses within that platform and retrieve a user's identifier and secret authenticator. However, when attempting to access the local computer system using the captured credentials, the client on the local computer will be transmitting the decoy password to the host ABS which will detect that the information submitted must have been obtained maliciously.

The local computer system authentication process is redirected to and interfaced with the host ABS. This host ABS makes use of local system authentication process paths and the local system authenticator file in which the identifiers are stored. This is achieved by the host ABS including an authenticator file, a decoy authenticator file and a mapping file. After authenticating on the host ABS system, the decoy password is generated and located in the local system authentication file. When an intruder tries to use a captured authenticator and identifier, an intrusion detection alert is sent to permit appropriate intrusion actions to be taken.

More particularly, the sign-on attempt at the local computer system is intercepted and forwarded to the host ABS where the authenticator corresponding to the intended user's identifier is retrieved from the authenticator file of the host ABS system. The host ABS system then seeds (i.e. replaces) the intended user's secret authenticator with a random decoy authenticator that is not known by the intended user. In the event that the intruder attempts to sign-on by using the identifier of the intended user and the decoy authenticator assigned by the host ABS system, a match will be detected between the authenticator entered by the intruder and the unique decoy authenticator previously stored by the host ABS. Since no one other than an intruder will have access to the unique and arbitrary decoy authenticator during an attempted break in, a match between the authenticator entered and the decoy authenticator assigned will verify that the authenticator file of the local computer system has been compromised so that appropriate warnings of an active intrusion can be provided to security personnel.

DESCRIPTION OF THE PREFERRED EMBODIMENT

Figure 1:
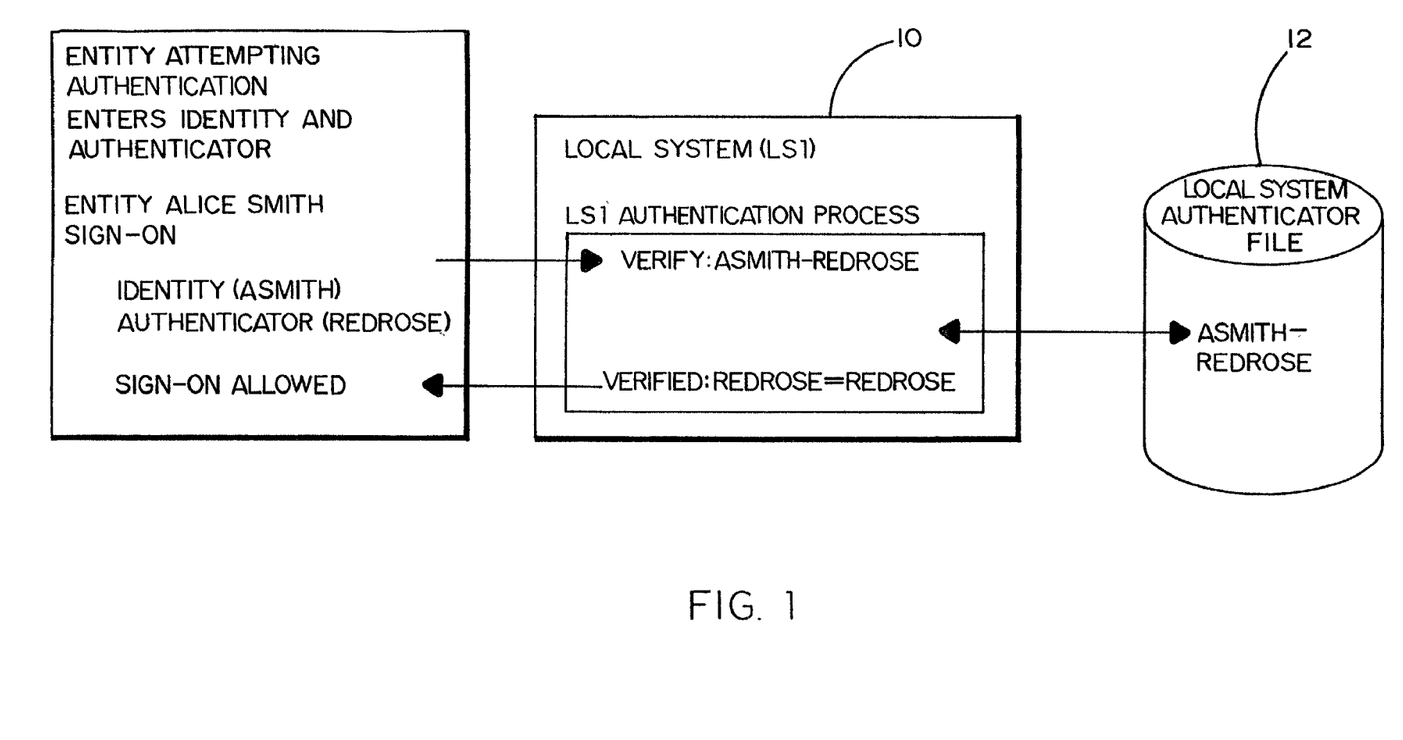
FIG. 1 illustrates a local computer system sign-on attempt where no authorization intrusion detection measures have been taken.

FIG. 1 of the drawings shows a basic local system sign-on process without authentication intrusion detection. The local system (LS1) 10 herein is any computer system or device that requires users to identify and authenticate themselves before access to the system is permitted. Although the user will typically be a person signing onto the system, the user could also be another system or device. In the example of FIG. 1, the user is an individual named Alice Smith. Alice Smith is assigned a personal user identifier. An individual user's identifier usually consists of a character string formed by letters, numbers or both. The character string, in this instance "asmith" is defined to the local system 10 and is used for controlling and tracking Alice's individual activities.

The local system 10 recognizes the character string "asmith" as a user's identifier. This particular character string, assigned to Alice may be known to others. Individual control and accountability requires that only Alice will use the identifier assigned to her. The foregoing s accomplished by also using an authenticator (i.e. a password) that is secret and known only by Alice. When Alice enters her identifier "asmith" to identify herself for sign-on access to the local system 10, she will be challenged by the system to provide her secret authenticator. Access to the system will be allowed only if she knows the correct identifier and corresponding authenticator combination (often referred to as identification and authentication or I&A).

In the example of FIG. 1, Alice Smith attempts to sign onto the local system 10 by entering her identifier "asmith" followed by her secret authenticator "redrose." The local system 10 takes Alice's identifier "asmith" and following a standard authentication process obtains from the local system authenticator file 12 the particular authenticator that is associated with the user identifier "asmith." During the authentication process, the authenticator entered by Alice is compared with the authenticator stored in the local system authenticator file 12. If the entered and stored authenticators (i.e. "redrose") are a match, then Alice's sign-on is allowed. If the entered and stored authenticators do not match, then Alice's sign-on is denied.

Figure 2:
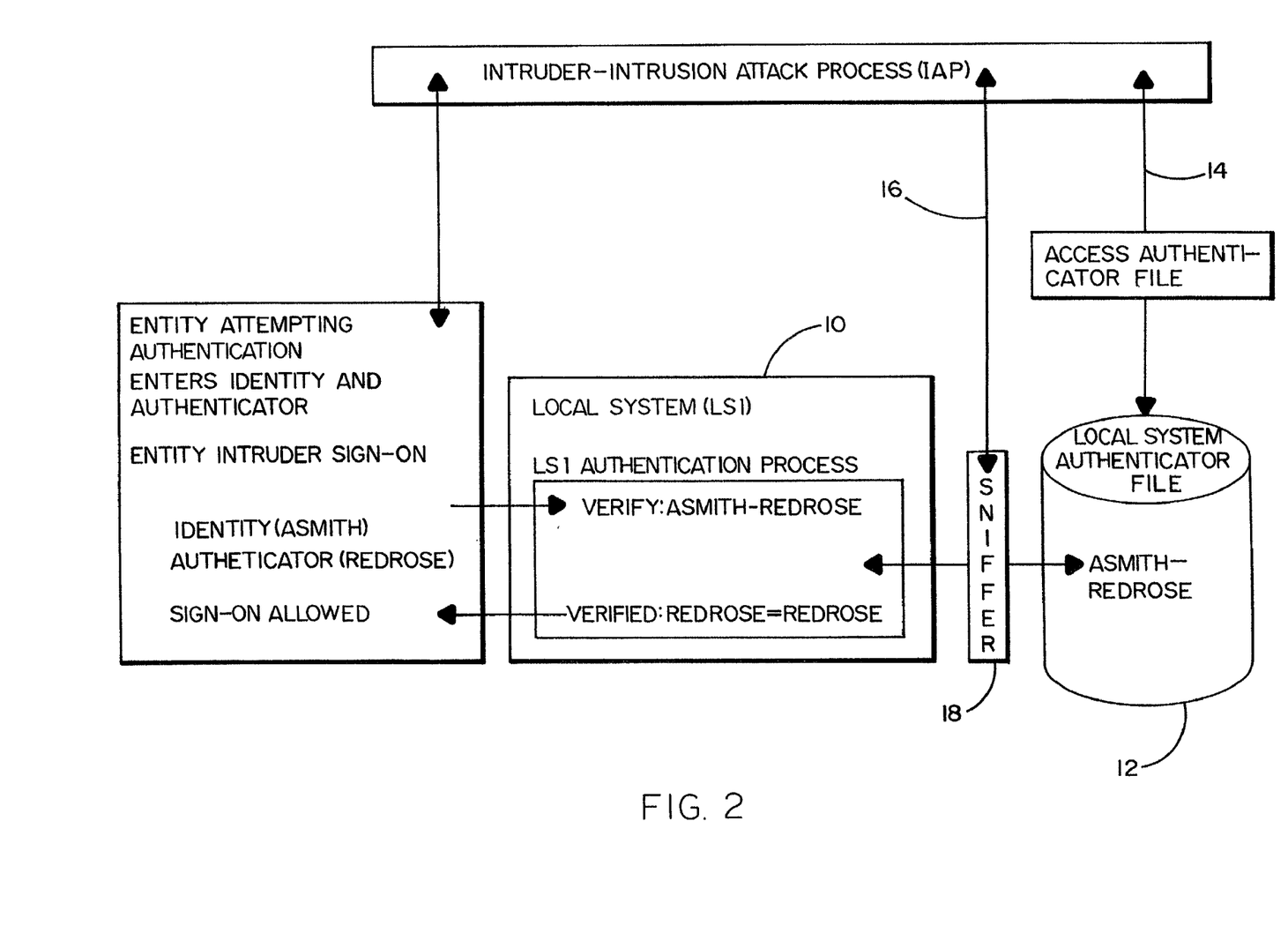
FIG. 2 illustrates the sign-on attempt of FIG. 1 where an intruder attacks the local computer system to capture identifier and authenticator information of an intended user.

FIG. 2 of the drawings illustrates the identical example shown in FIG. 1, except that an intrusion/intruder attack process (IAP) has been initiated. In the case where the local system 10 is subjected to an intrusion attack process, Alice's identifier ("asmith") and authenticator ("redrose") are captured by an intruder by means of one of several methods. In one method 14, the intruder obtains Alice's identifier and authenticator by accessing the authenticator file 12 of the local system 10. In another method 16, the intruder intercepts Alice's identifier and authenticator by monitoring (by means of a "sniffer" 18) the path over which the identifier and authenticator information travel between the local system 10 and its authenticator file 12. Sniffers are well known line monitoring programs.

Both methods 14 and 16 can be accomplished at a large number of capture points. Some capture points can be shared among different systems and devices, while other capture points are unique to a specific system or device. Thus, a skilled intruder will be able to capture the user's identifier and authenticator at different times and locations during the sign-on process. Consequently, the intruder can use the purportedly secret and personal information of the intended user wherever and however the intruder chooses.

In this regard, the intruder can now use the captured information to sign onto the local system 10 by entering Alice's identifier ("asmith") and secret authenticator ("redrose"). Since the local system 10 cannot distinguish between Alice and an intruder, access to the system will be allowed when the intruder enters the correct identifier and authenticator combination. At this point, the integrity of the local system will be compromised by the intruder in a manner that will be unknown to Alice or her employer.

Figure 3:
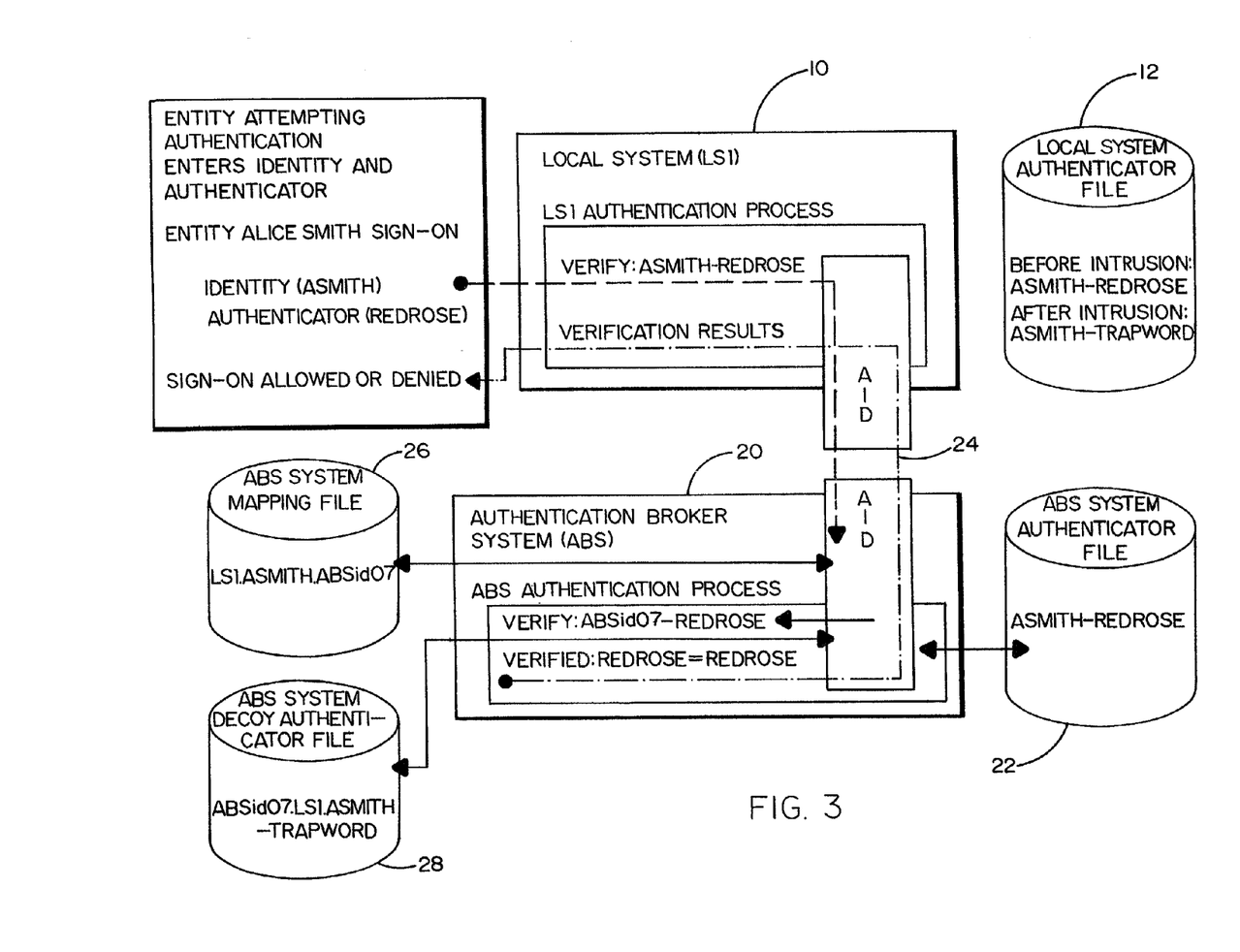
FIG. 3 illustrates the sign-on attempt of FIG. 2, wherein the local computer system is now provided with authentication intrusion detection by means of a host ABS system including a mapping file and a decoy authenticator file for the purpose of providing a decoy authenticator and thereby detecting an active intrusion.

FIG. 3 of the drawings shows the same basic local sign-on process that was previously described when referring to FIGS. 1 and 2, except that the local system 10 is now provided with authentication intrusion detection by means of a host authentication broker system (ABS) 20. The host ABS system 20 enables the local system authentication process to be redirected to the host ABS system. This host ABS system 20 intercepts the local system authentication process by the use of a client on the local computer system 10. The host ABS system 20 also includes an ABS mapping file 26 and a decoy authenticator file 28.

When Alice attempts to sign-on to the local system 10, she once again enters her identifier ("asmith"). In this case, the local sign-on is intercepted by the authentication intrusion detection software 24 and forwarded to the host ABS system 20. The host ABS system 20 refers to the ABS mapping file 26 to associate the local system identifier (asmith) with a mapped identifier (ABSid07) on the host ABS system. By using a mapping file, one can assure unique identifiers and can associate an individual's unique identifier to the same person on different systems.

The host ABS system performs verification on "ABSid07" using "redrose" as the password. If the authentication is successful, the authentication broker system 20 retrieves a decoy password (i.e. a trapword) from the ABS decoy authenticator file 28 and returns the authentication result, along with the new decoy authenticator, to the local system 10. The local system authenticator file 12 is updated for identifier "asmith" with a new decoy authenticator (trapword). Based on the results transmitted to it, the local system 10 will either allow or deny the user's sign-on attempt.

Figure 4:
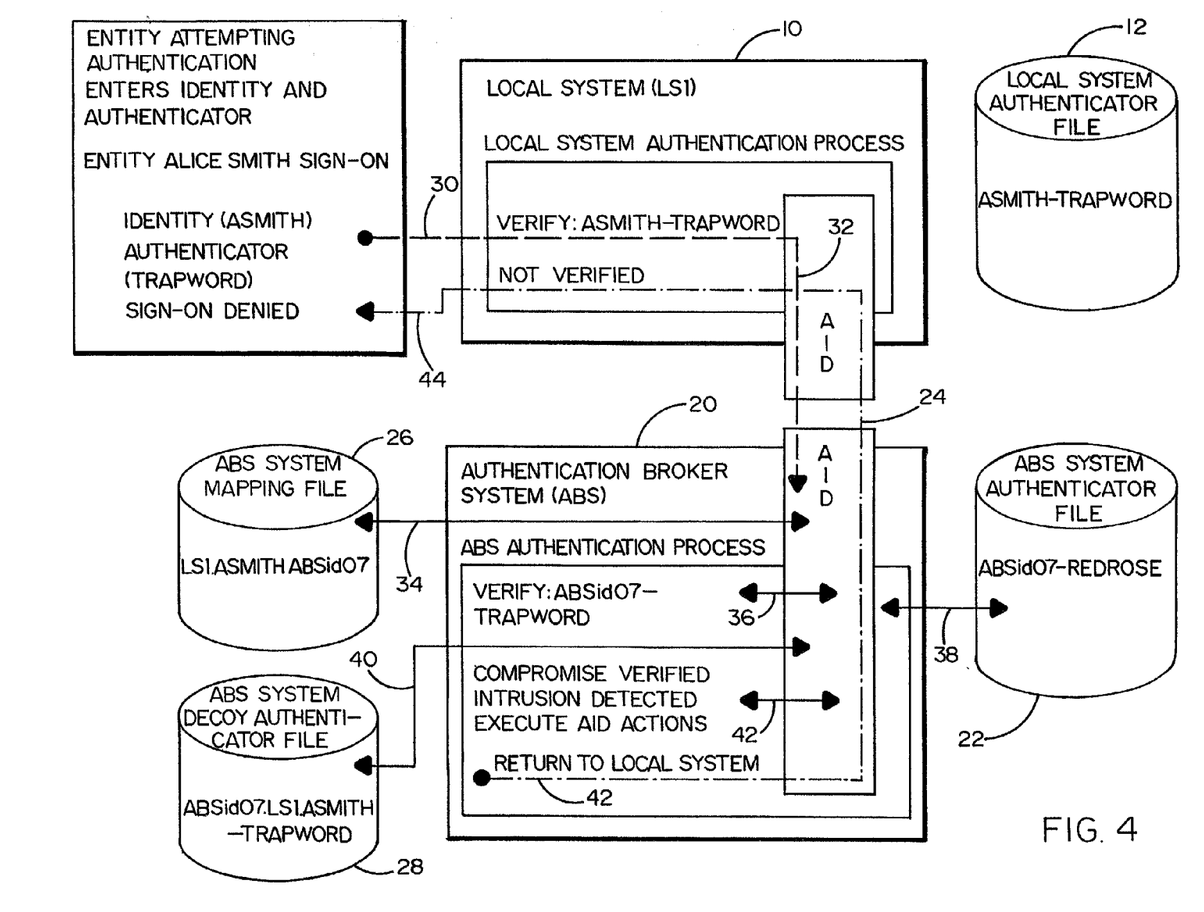
FIG. 4 illustrates the sign-on attempt of FIG. 3 during an intrusion.

FIG. 4 of the drawings shows the same local system 10 and host ABS system 20 of FIG. 3 during an intrusion. Implementation of the authentication intrusion detection process (AID) of FIG. 4 begins when an intruder attempts to log onto the local system 10 by using the captured identifier ("asmith") and authenticator (trapword) (Step 30). The authentication intrusion detection software 24 causes the identifier and authenticator of the local sign-on attempt to be intercepted and redirected to the host ABS system 20 (Step 32). The authentication broker system 20 now locates in its ABS mapping file 26 a unique identifier (in this case, for example, ABSid07) which was previously mapped from the user's original identifier "asmith" (Step 34). The authentication broker system 20 then replaces (for this authentication only) the user's original identifier "asmith" with the mapped identifier "ABSid07" and forwards the mapped identifier along with the decoy authenticator (trapword) (Step 36). Thus, the identifier/authenticator combination (asmith, trapword) becomes (ABSid07, trapword).

During the authentication intrusion detection process, the user's original authenticator "redrose" is retrieved from storage in the authenticator file 22 of the host ABS system 20 (Step 38). Since the authenticator "trapword" is not a match with "redrose" the authentication attempt will not be successful. The host ABS system 20 then obtains the decoy authenticator "trapword" for the mapped identifier 28 and makes a comparison of the decoy authenticator to the authenticator entered by the intruder which, in this case, is "trapword" and "trapword." (Step 40). A match will verify that the authenticator file 12 of the local system has been compromised and an active intrusion is detected (Step 42). The host ABS system 20 may execute whatever intrusion actions are contemplated when a local system intrusion is detected. However, the precise nature of the actions that are taken in response to the detection of a local system intrusion do not form a part of this invention. In the case where a comparison of the decoy authenticator to the authenticator entered by the intruder does not result in a match, the sign-on attempt is denied, and no intrusion detection actions are executed.

The host ABS system 20 will then return the failed authentication to the local system 10 with notification of the intrusion (Step 42). Accordingly, the local system authentication process will fail local authentication, so that the sign-on attempt is denied and any predetermined system administrator defined actions are taken in an effort to identify the intruder and to send a suitable warning to security officials (Step 44).

An additional example is now described while continuing to refer to FIG. 4 for applying the AID technique of this invention to a particular method for achieving unattended automatic security for a computer system, preferably including a mainframe. This method is especially effective because of its ability to detect an attempted compromise to the system and alert and authorize security official before the attempted compromise can be completed, so as to prevent an intrusion to, and possible damage of the system as well as the data stored therein. The method herein disclosed is capable of capturing an authentication attempt and extracting certain data therefrom. The extracted data is then compared to the protected authentication data of the computer platform. An alert is generated to warn security officials and either refuse the authentication request or transfer control to a parallel system to monitor an intruder's activity if the comparison between the protected data and the extracted data indicates a compromise and, therefore, an impending intrusion. In addition, a report can be provided to warn security officials of suspicious activity in response to an excessive number of failed attempts by a particular user attempting to authenticate. Of course, prompt authentication must be allowed for those users who enter valid authentication requests.

Two systems are involved in the authentication intrusion detection and prevention method of this example. The first system 10 is local and is at the location at which a user attempts to log on, and the second system 20 is a host system, which is responsible for authenticating the log on and detecting any intrusion. A user is first asked for his or her identification in an effort to log onto the local system (designated 10 in FIG. 4). For purposes of example only, the local system is a Windows NT system and the host is an IBM mainframe computer.

As the initial step of this example, to generate a mapped host ID and authenticator password for a first time user, the user enters his or her personal identifier (or an identifier for another computer accessing the local system) or user name (e.g. LOCALUSR) and his or her secret authenticator or password (e.g. LOCALPSWD) at the local system 10. This information is then sent to the host system 20. The mainframe computer of the host system contains a repository of user information in a secure mapping database 26. The host mainframe computer receives the user's request to log on and checks its mapping database 26 to determine if the local identifier (LOCALUSR) has been associated with or mapped to a user ID on the host mainframe.

In the case where it is found that there is no record of the username being mapped to a user ID on the mainframe, then the request to log on is denied and returned to the user's local system 10 where the user is informed that he or she does not have a host ID. The user is then taken through a mapping process during which he or she is assigned a host ID (e.g. HOSTID) and an authenticator (e.g. HOSTPSWD). That is to say, an association is created in the mapping database 26 in the mainframe between the mainframe user ID and the Windows/NT user ID.

The host ID and user authenticator are then authenticated on the host system and, if valid, a mapping record is created and stored in the mapping database 26 such that, for the present example, LOCALUSR is mapped to HOSTID. It is important to the present method that the assigned password be recorded on the mainframe host computer.

Once the local user has created a mapping record, he or she (or it) will now use the host authenticator when attempting to log on. In other words, the local user will now log on by means of the identifier LOCALUSR and the authenticator HOSTPSWD. The host computer will read the previously established mapping record for LOCALUSR and retrieve the newly assigned host ID which, in this case, is HOSTID. The host computer now attempts to authenticate the user who is using the mapped identifier HOSTID and authenticator HOSTPSWD. It is important to the effectiveness of the disclosed method that the user's original authenticator be set to the assigned authenticator and that the user is logged on with the aid of the newly issued authenticator.

In accordance with the improved security feature of this method for detecting an unwanted intrusion, provided that the authentication is successful, the host computer (i.e. the host ABS system 20 of FIG. 4) creates a decoy password (e.g. DECOYPSWD) from its decoy authentication file 28. A new and different password can be created each time a user performs a log on. The decoy password is stored on the authenticator file 22 of the host computer and returned to the local system 10 where it is also stored in the local authenticator file 12 thereof. The authenticator on the local system 10 for LOCALUSR now becomes DECOYPSWD. However, it is important to recognize that the decoy password is preserved in secrecy, and the local user has no indication that his authenticator has been swapped for the new decoy password. In this regard, the user in under the impression that his authenticator on the local system is still HOSTPSWD.

The issued authenticator (DECOYPSWD) assigned by the host computer must be different than the authenticator (HOSTPSWD) that is originally employed by the user to log onto the local system 10. The issued authenticator (DECOYPSWD) may be weak or look normal in order to facilitate an intruder's attempt to crack into the system and thereby enable a quick detection and warning in a manner that will soon be explained. Of course, the issued authenticator may also be strong, such as that consisting of a strange alphanumeric combination of letters, numbers and symbols which will make the intruder's attempt to break in more difficult. While this approach sounds desirable, it is likely to "tip-off" an intruder causing him to stop the current attack before being detected. It would be beneficial to allow the failing attack to continue so that other options may be exploited against the attacker without the attacker's knowledge.

In the event that the authenticator file 12 on the local system is cracked, the intruder will identify and capture the authenticator DECOYPSWD for the identifier LOCALUSR. Inasmuch as the authenticator stored on the host computer is HOSTPSWD, the host computer will fail to authenticate the intruder should he attempt to log on by means of the identifier LOCALUSR and the authenticator DECOYPSWD. The host computer will compare the authenticator that was entered by the user to one or more stored decoy passwords. Since only the intruder can access the decoy password through a break-in of the local system, any match is indicative of a compromise in the authenticator file 12 on the local system. Accordingly, such an intrusion may be detected so that a warning or alarm and/or other actions can be initiated and recorded and/or sent to appropriate security officials for handling and monitoring.

The present invention allows a user to accesses a plurality of local systems, each system being identified in an identifier mapped to each decoy and authenticator, and wherein the identification of a compromised system is determined by the local system identifier. Moreover, the mapping file can be used to map an identifier to the decoy and authenticator that includes a date and/or time stamp, whereby one can determine the relative date and/or time of compromise.

By virtue of the present invention, it will be possible to identify an authenticated intrusion instantly during the intrusion process and before the intruder knows that he has been detected. That is to say, the intruder will be unaware that he has captured the decoy password which is used to indicate his unauthorized attempt to access the local computer system. Moreover, security officers will now have the ability to defend their computer systems and/or devices from an intruder before he gains access thereto. In this same regard, security officials will also be able to identify, acknowledge, monitor, record and take any other appropriate action to prevent the intrusion without the intruder knowing that he has been identified. What is even more, the present invention permits security officials to be notified when an intrusion is initiated and in progress. Thus, security officials and/or parallel security monitoring systems will be able to monitor and record the behavior of the intruder, back-trace and forward-trace intruder access, and escort an intruder into a safe environment to monitor his behavior and content specific behavior and to deliver information and/or disinformation based upon the intruder's behavior. In addition, security officials can be informed on an instantaneous basis when a computer system or computer device has been compromised. Accordingly, the security officials will be able to determine the relative times when such compromise and attempted access occurred.

I claim:

1. An authentication intrusion detection system responsive to an attempted intrusion into a local computer system to which access is gained by prospective users entering a personal identifier followed by a secret authenticator, said authentication intrusion detection system comprising:

a local computer system authenticator file communicating with said local computer system and having stored therein the secret authenticators corresponding to the personal identifiers entered by prospective users;

an authenticator broker system to intercept and redirect the identifier and secret authenticator of a prospective user from the local computer system;

an authenticator broker file communicating with said authenticator broker system and having stored therein the secret authenticators corresponding to the personal identifiers entered by the prospective users at the local computer system and stored in the local computer system authenticator file, whereby a prospective user can gain access to the local computer system when the authenticator entered by the prospective user matches the authenticator stored in said authenticator broker file; and a decoy authenticator file communicating with the authenticator broker system to assign a decoy authenticator for the secret authenticator entered by the prospective user at the local computer system and stored in the local computer system authenticator file, wherein said decoy authenticator file is a mapping file and wherein a replacement identifier is randomly assigned by said mapping file for the identifier entered by the prospective user and intercepted by said authenticator broker system.

2. The authentication intrusion detection system recited in claim 1, wherein said replacement identifier assigned by said mapping file for the identifier entered by the prospective user and intercepted by said authenticator broker system is unique to the prospective user.

3. The authentication intrusion detection system recited in claim 1, wherein said replacement identifier assigned by said mapping file for the identifier entered by the prospective user and intercepted by said authenticator broker system is unknown to the prospective user.

4. The authentication intrusion detection system recited in claim 1, wherein said authenticator broker system is a host computer that is responsive to the prospective user's attempt to gain access to the local computer system and to any intrusion into the local computer system.

5. The authentication intrusion detection system recited in claim 4, wherein said host computer is a mainframe computer.

6. The authentication intrusion detection system recited in claim 5, further comprising a mapping file communicating with the authenticator broker system to assign said replacement identifier stored in said mapping file for the identifier entered by the prospective user at the local computer system and intercepted by said authenticator broker system, said authenticator broker system, said mapping file and said decoy authenticator file being located at said mainframe host computer.

7. A method for detecting a compromise by an intruder to a local computer system that requires authorized users to log onto the local computer system by means of successfully entering a personal identifier and a secret authenticator for purposes of user authentication, said method comprising the steps of:

intercepting the secret authenticator entered by the authorized user at the local computer system and forwarding the secret authenticator to an authenticator broker system;

transmitting from the authenticator broker system to the local computer system a decoy password in substitution of the secret authenticator of the authorized user; and logging the authorized user onto the local computer system on the basis of the decoy password transmitted to the local computer system from the authenticator broker system;

whereby an intruder who breaks into the local computer system will capture and enter the authorized user's personal identifier and the decoy password substituted for the authorized user's secret authenticator to be forwarded to the authenticator broker system by which to provide an indication that the local computer system has been compromised, and wherein the authorized user accesses a plurality of local computer systems, each local computer system being identified in a system identifier mapped to each decoy password and secret authenticator, and wherein the identification of a compromised local computer system is determined by the system identifier thereof.

8. The method recited in claim 7, including the additional step of storing the decoy password in an authenticator file of each of said local computer system and said authenticator broker system.

9. The method recited in claim 7, including the additional step of maintaining the decoy password in secrecy from the authorized user.

10. A method for detecting unauthorized access and an intrusion into a local computer to which access is gained by a user signing on with a local identifier and a secret authenticator to identify himself to the local computer, said method comprising the steps of:

transmitting the user's local identifier and secret authenticator to an authentication broker system and associating the secret authenticator with a corresponding mapped identifier stored on the authentication broker system;

verifying on the authentication broker system the mapped identifier with the secret authenticator to authenticate the user;

retrieving a decoy authenticator and returning the decoy authenticator and the verification of the user to the local computer;

assigning a random replacement identifier for the local identifier entered by the user during sign on; and associating the decoy authenticator with the local identifier at the local computer.

11. The method recited in claim 10, wherein said authentication broker is located on a host computer that is remote from the local computer system.

12. The method recited in claim 11, wherein said remote host computer is a mainframe computer.

* * * * *